United States Patent
Kojima et al.

(10) Patent No.: US 6,251,258 B1
(45) Date of Patent: Jun. 26, 2001

(54) METHOD AND APPARATUS FOR REMOVING TOXIC SUBSTANCES FROM WASTE MARINE PRODUCTS

(75) Inventors: Masayuki Kojima; Toshiyuki Hishinuma; Hiroyuki Ichikawa, all of Chiyoda-ku; Hiroshi Asakura; Masataka Kasai, both of Toshima-ku, all of (JP)

(73) Assignee: Hitachi Plant Engineering & Construction Co., Ltd., Tokyo (JP)

(*) Notice: Subject to any disclaimer, the term of this patent is extended or adjusted under 35 U.S.C. 154(b) by 0 days.

(21) Appl. No.: 09/412,650

(22) Filed: Oct. 5, 1999

(30) Foreign Application Priority Data

Dec. 11, 1998 (JP) .................................. 10-353136

(51) Int. Cl.$^7$ ........................................ C02F 1/461
(52) U.S. Cl. ..................... 205/702; 205/771; 205/772; 588/204
(58) Field of Search .................................. 205/702, 771, 205/772; 588/204

(56) References Cited

U.S. PATENT DOCUMENTS 4,193,854    3/1980    Drnevich et al. .
5,043,050  * 8/1991    Herbst .......................... 204/272

FOREIGN PATENT DOCUMENTS

| 0921731 | 8/1997 | (EP) . |
| 387 483 | 2/1933 | (GB) . |
| 8-99001 * | 4/1996 | (JP) . |
| 9-47257 * | 2/1997 | (JP) . |
| 2135986 | 2/1998 | (JP) . |

* cited by examiner

Primary Examiner—Arun S. Phasge
(74) Attorney, Agent, or Firm—Oliff & Berridge, PLC

(57) ABSTRACT

In an electrolytic bath, an extraction part extracts heavy metal in the internal organs of scallops into an acid solution. A direct current voltage is applied between electrodes, which are provided in the acid solution, to deposit the heavy metal in the acid solution on the electrodes. If the deposit efficiency deteriorates, the polarity applied between the electrodes is reversed from the polarity in the deposition of the heavy metal in a neutral or alkali electrolytic solution. Consequently, the heavy metal is removed from the electrodes. Since arsenic is dissolved in the acid solution, an alkali liquid and a flocculant are added to the acid solution to sediment arsenic.

7 Claims, 5 Drawing Sheets

F I G. 2
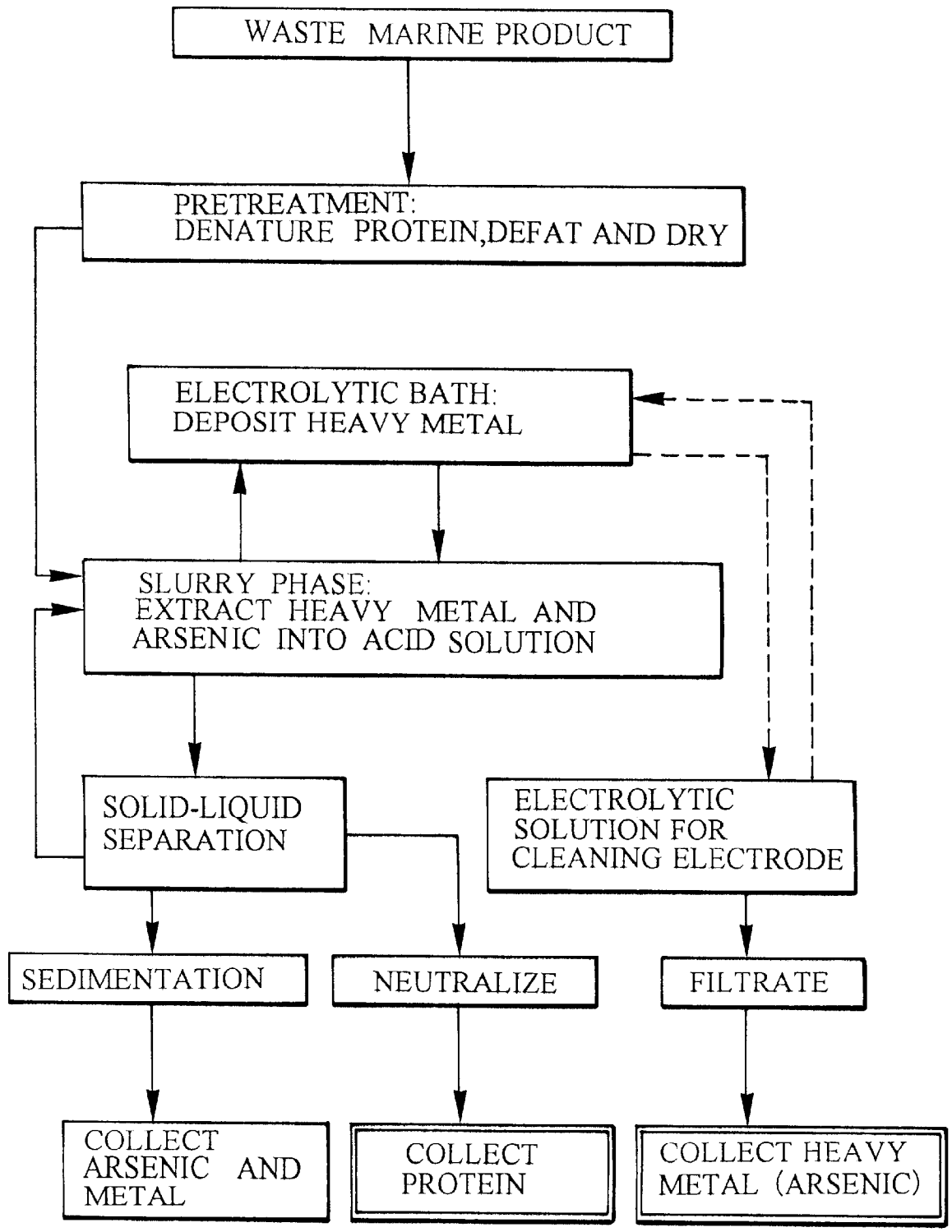

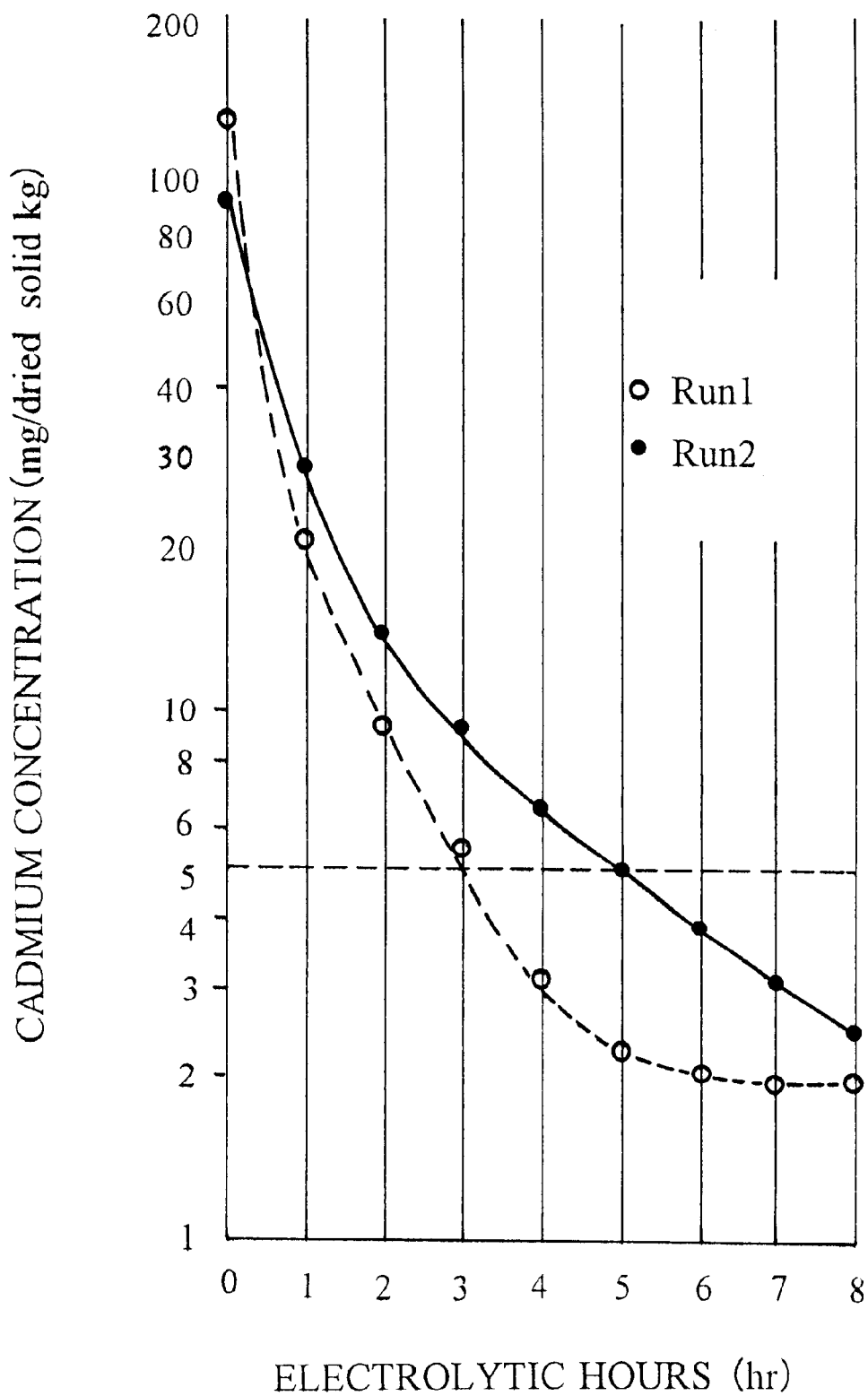
F I G. 4

METHOD AND APPARATUS FOR REMOVING TOXIC SUBSTANCES FROM WASTE MARINE PRODUCTS

BACKGROUND OF THE INVENTION

1. Field of the Invention

The present invention relates generally to a method and apparatus for removing toxic substances from waste marine products, and more particularly to a method and apparatus for removing toxic substances from waste marine products, which extracts the toxic substances such as heavy metal and arsenic included in the waste marine products such as cuttlefishes, shellfishes, shells (scallops in particular) and fishes into an acid solution and separates/collects the toxic substances.

2. Description of Related Art

Sometimes, the toxic substances such as heavy metal (e.g., silver, copper, cadmium and zinc), arsenic and phosphorus are concentrated in the internal organs, liver and kidney of fishes and cuttlefishes and the internal organs of shells. The concentration of the heavy metal in the marine products varies according to the kinds and organs of the marine products, the seasons and the habitats. The concentration of the heavy metal is high from the summer to the autumn when the temperature is high, and the heavy metal of 30–100 mg/dried solid 1 kg or more is included in the marine products. When the temperature is low, the heavy metal of several ten mg may be included in the marine products. Arsenic of several ten mg may also be included in some kinds and organs of the marine products.

Waste marine products including the toxic substances such as heavy metal and arsenic are buried in the ground, thrown into the sea and incinerated. If a large amount of waste marine products is discarded, they become toxic wastes that may pollute the environment. It is therefore preferable to discard the waste marine products after the toxic substances such as heavy metal and arsenic are removed from the waste marine products in order to prevent the pollution of the environment.

Since the waste marine products includes protein of high concentration, the waste marine products may be reused for animal food if the concentration of the heavy metal per 1 kg of dried solid is 5 mg or less and the concentration of arsenic per 1 kg of dried solid is 1 mg or less. The concentration of heavy metal and arsenic are allowed to be higher than feed if the waste marine products are reused for fertilizers.

Accordingly, Japanese Patent Provisional Publication Nos. 8-99001 and 9-47257 disclose the technique of extracting the heavy metal included in the waste marine products into a sulfuric acid solution, or the like and electrolytically removing the heavy metal included in the extracted solution. This technique has been developed around Hokkaido prefectural industrial laboratory.

In a conventional method of removing the heavy metal in the electrolysis, the heavy metal in the waste marine products is proved to be eliminated at a high removal rate of 99% or more, but the waste marine products must be processed for dozens of hours (Japanese Patent Provisional Publication No. 8-99001) and for about twenty-four hours (Japanese Patent Provisional Publication No. 9-47257) until the concentration of the heavy metal is reduced to an allowable value of 5 mg/dried solid 1 kg.

In addition, the deposit including the heavy metal is accumulated on the surfaces of the electrodes, and the protein in the waste marine products is adhered to the surfaces of the electrodes. This remarkably lowers the heavy metal deposition efficiency.

The deposition efficiency is lowered since the heavy metal, which is excessively deposited on the surfaces of the electrodes, is separated from the surfaces of the electrodes or the adhesive deposit including the heavy metal is adhered to the surfaces of the electrodes.

To address this problem, when the deposit including the heavy metal is excessively accumulated on the surfaces of the electrodes and the surfaces of electrodes become unclean, the surfaces of the electrodes are cleaned by rubbing the surfaces of the electrodes by brush, sponge, or the like to recover the deposition efficiency.

In the case of experimental equipment used in a laboratory, the surfaces of the electrodes can be rubbed by the brush and the sponge, but a large plant has dozens of electrodes with surface area of 1 $m^2$ or more. Thus, the weight of the plant is in the metric ton level. In the case of the large plant, it is impossible to take out the electrodes from the electrolytic bath, clean the electrodes and then mount the electrodes in the electrolytic bath if the cleaning time and labor are taken into consideration.

Arsenic and phosphorus as well as the heavy metal are extracted into the acid solution, and thus, it is necessary to separate and collect arsenic as well as the heavy metal.

SUMMARY OF THE INVENTION

In view of the foregoing, it is an object of the present invention to provide the method and apparatus for removing the toxic substances from the waste marine products, which makes it possible to remove the toxic substances such as heavy metal and arsenic from the waste marine products with extremely high efficiency at low cost.

To achieve the above-mentioned object, the present invention is directed to a method of removing a toxic substance from waste marine products, the method comprising: an extraction step of bringing waste marine products including heavy metal as a toxic substance into contact with an acid solution including at least one of sulfuric acid and hydrochloric acid to thereby extract the heavy metal from the waste marine products into the acid solution; an electrolysis step of applying a direct current voltage between electrodes provided in the acid solution, into which the heavy metal is extracted, to thereby deposit the heavy metal in the acid solution on the electrodes; and an electrode cleaning step of reversing the polarity applied between the electrodes in a neutral or alkali electrolytic solution from the polarity in the electrolysis to thereby remove the heavy metal from the electrodes.

According to the present invention, the heavy metal included in the waste marine products is extracted into the acid solution including at least one of sulfuric acid and hydrochloric acid, and the direct current voltage is applied between the electrodes provided in the acid solution to deposit the heavy metal in the acid solution on the electrodes. If the heavy metal, or the like excessively deposits on the electrodes to lower the deposition efficiency, the polarity of the electrode applied between the electrodes in the neutral or alkali electrolytic solution is reversed from the polarity in the electrolytic deposition to thereby remove the heavy metal from the electrodes. This enables the efficient removal of the heavy metal from the waste marine products and drastically reduces the electrode cleaning time.

According to the present invention, the acid solution in slurry, which is formed by mixing powder of the waste marine products and the acid solution, is circulated between the extraction step and the electrolysis step to extract the heavy metal and deposit the heavy metal on the electrodes. This improves the extraction efficiency and the deposition efficiency of the electrodes.

According to the present invention, the circulating flow of the acid solution circulated between the extraction step and the electrolysis step is formed by a rising force of bubbles in the air blown into the acid solution, the bubbles rising between the electrodes. This makes the circulation slower than the circulation by the mechanical force of a stirrer, or the like, so that the heavy metal can be separated from the electrodes by force of the circulating flow.

According to the present invention, if the waste marine products includes arsenic as a toxic substance, an alkali agent and a flocculant are added to the acid solution, from which the waste marine products is separated after the electrolysis step, to thereby adjust the acid solution to pH8–11.5 so that flocculation including arsenic can sediment in the acid solution. This enables the removal of arsenic, which is extracted at the extraction step but is hardly removed at the electrolysis step.

According to the present invention, in a pretreatment before the extraction step, crude fat of the waste marine products measured using ethyl ether as a solvent is reduced to 15% or less per dried solid weight in a pretreatment before the extraction step; a water content is reduced to 25% or less; and protein in the waste marine products is denatured. This makes it easier to handle the acid solution, and raises the concentration of the waste marine products in the acid solution. As a result, the heavy metal removal efficiency can be improved remarkably.

To achieve the above-mentioned object, the present invention is directed to an apparatus for removing a toxic substance from waste marine products, the apparatus comprising: an extraction part for bringing waste marine products including heavy metal as a toxic substance into contact with an acid solution including at least one of sulfuric acid and hydrochloric acid to thereby extract the heavy metal from the waste marine products into the acid solution; an electrolysis part for applying a direct current voltage between electrodes provided in the acid solution, into which the heavy metal is extracted, to thereby deposit the heavy metal in the acid solution on the electrodes; and an electrode cleaning part for reversing the polarity applied between the electrodes in a neutral or alkali electrolytic solution from the polarity in the electrolysis to thereby remove the heavy metal from the electrodes.

This enables the efficient removal of the heavy metal from the waste marine products and remarkably reduced the electrode cleaning time. If the electricity is turned on in an alternating method in which the polarity of the electrodes is switched alternately, the deposit on the positive electrodes can also be removed.

According to the present invention, the electrodes are arranged above the extraction part, and air bubbling means is provided between the electrodes and the extraction part, and a circulating flow of the acid solution is formed between the extraction part and the electrodes by a rising force of bubbles in the air blown out from the air bubbling means. This enables a slower circulation than the mechanical circulation, and prevents the heavy metal extracted on the electrodes from being separated from the electrodes by force of the circulatory flow. In this case, the air bubbling means blows out the bubbles of 3 mm or less and more preferably between 1 mm and 2 mm in diameter with a small force to form the slow flow of the solution near the electrodes. This decreases the concentration gradient of the heavy metal in proximity to the electrodes, and enables the cataphoretic action of the heavy metal in proximity to the surfaces of the electrodes. Therefore, the electrodes can efficiently capture the heavy metal. If the diameter of the bubbles is in excess of 3 mm, the stirring force is increased to such an extent as to separate the heavy metal deposited on the surfaces of the electrodes. Strongly blowing the air during the cleaning of the electrodes facilitates the removal of the heavy metal from the electrodes.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a flow chart showing an example of the process for removing the toxic substances from the raw material of waste marine products to acquire powder of waste marine products with the decreased amount of toxic substances;

FIG. 4 is a view showing the results of the examination for checking the effect of crude fat in the electrolytic deposition of heavy metal.

DETAILED DESCRIPTION OF THE PREFERRED EMBODIMENT

Figure 1:
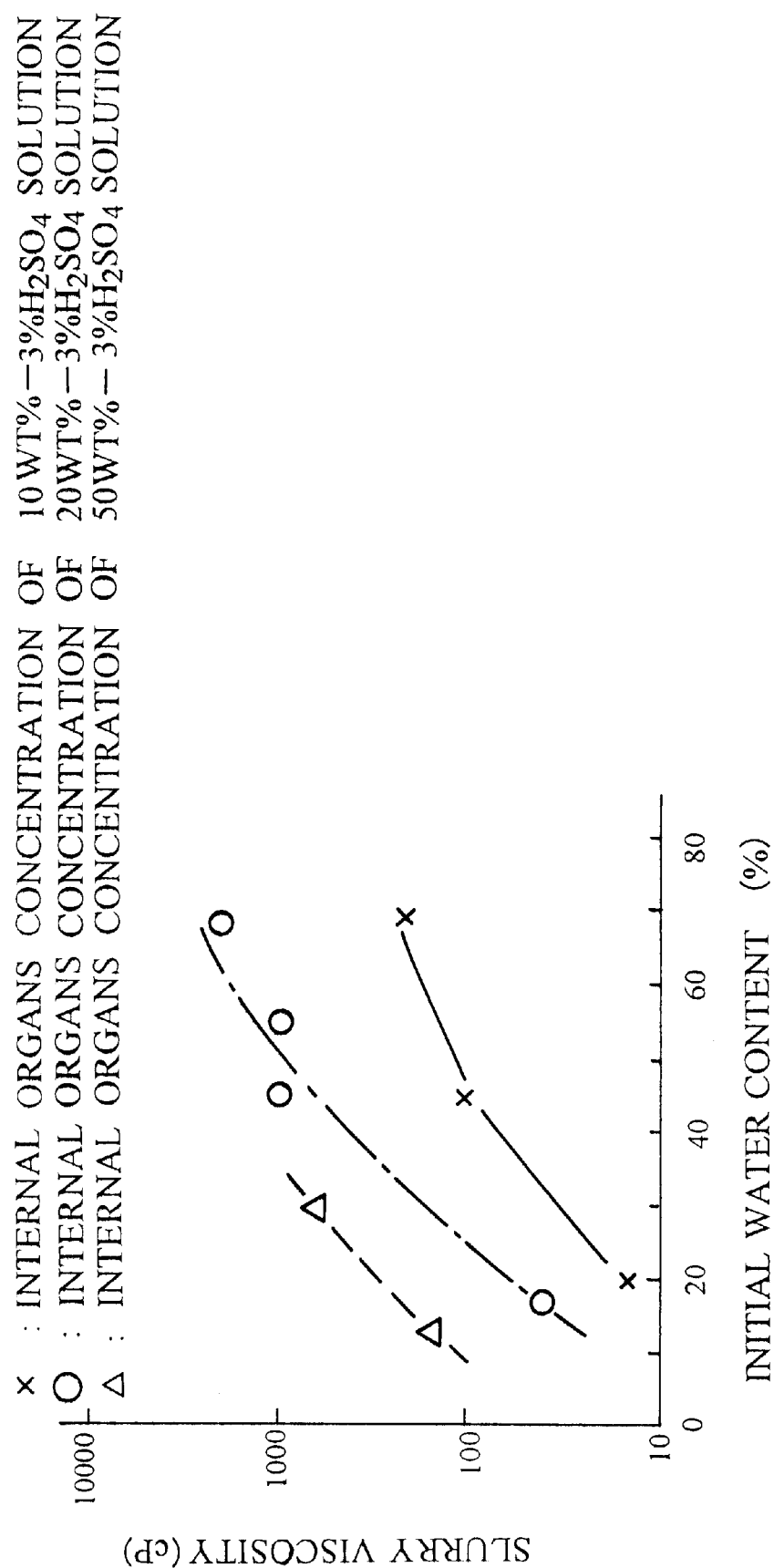
FIG. 1 is a view showing a relation between the initial water content and the viscosity in the case that the internal organs are changed into slurry in 3% sulfuric acid solution.

This invention will be described in further detail by way of example with reference to the accompanying drawings.

First, a description will be given of the knowledge gained by an inventor in the development of a method and apparatus for eliminating toxic substances from waste marine products according to the present invention.

Some waste marine products include toxic substances such as heavy metal and arsenic. The heavy metal takes a variety of forms; for example, metal thioneine is heavy metal concentrated protein, and cadmium is combined with sulfur between cystein residues to become a cluster compound to construct the higher structure of the protein. The heavy metal may be combined with carboxyl group, etc. in fat, and may be incorporated into an amino acid complex.

If waste marine products including the heavy metal as the toxic substance is immersed in an acid solution (electrolytic solution), the heavy metal in the waste marine products is extracted as ions or is extracted as sol substance or gel substance in the state of being combined with organic substances such as protein in the waste marine products. If an electrolysis is performed for scores of hours by applying direct current voltage between electrodes provided in the acid solution in which the heavy metal ions are extracted, the black brown film with metallic luster or viscose gel substances are adhered to the surface of the cathode. If a large amount of the gel substances adhered to the electrode surfaces, the deposit speed of the heavy metal is significantly lowered even if the same amount of electric current is supplied. This deteriorates the heavy metal removing performance of the electrolysis.

If the deposit on the electrode surfaces is analyzed, a metallic oxide such as iron, zinc and magnesium, and an organic substance mainly comprised of protein are detected. Most of the gel substances adhered to the electrodes is organic substances, which include a little amount of arsenic. A part of arsenic, which is the toxic substance in the waste marine products, is removed from the acid solution as the gel substances adhered to the electrodes in the electrolysis.

Consequently, the bare heavy metal ions and the charged gel substance, which is the combination of the heavy metal and the organic substances in the waste marine products, are mixed in the acid solution, and the gel substance includes the toxic substances such as arsenic. If the extraction is performed while forming the slow flow of the acid solution in proximity to the electrode surfaces, the desirable extraction efficiency can be maintained. As soon as the flow stops, however, the extraction efficiency decreases. For this reason, if there is no flow of acid solution near the electrode surfaces, a layer of the gel substances is formed on or near the electrode surfaces to disturb the movement of the heavy metal ions toward the electrode. Since the adhesion of the gel substances adhered to the electrode surfaces is small, however, the gel substances can easily be separated from the electrode surfaces by the shearing force of the flow of the acid solution formed in proximity to the electrodes.

If the air as well as the gas generated by the electrolysis are weakly jetted toward the cathode, the flow of the acid solution is formed in proximity to the cathode to thereby decrease a concentration gradient and brake the layer of the gel substances with bubbles. This improves the extraction efficiency. In this case, the inert gas such as nitrogen may be used instead of the air. The diameter of the bubbles is 3 mm or less, and more preferably between 1 mm and 2 mm. In this case, the area in the proximity to the electrodes may be stirred mechanically, but as stated above, the physical stir breaks the layer of the gel substances, but forms the uneven flow. This unnecessarily separates the heavy metal deposited on the electrodes.

If the removal of the heavy metal in the electrolysis is continued for a long period of time, an excessive amount of deposit such as the heavy metal and the gel substances is accumulated on the electrode surfaces and this disturbs the electrolysis. If the acid solution in the electrolytic bath is replaced by neutral or alkali electrolytic solution such as brine, the polarity applied between the electrodes is reversed from the polarity in the electrolytic deposit of the heavy metal, and the electric current of about 0.1 A/dm$^3$ is passed through (reverse electrolysis); the electrodes on which the heavy metal is deposited turns brown within scores of minutes, and then a black film is separated from the electrode surfaces to expose the electrodes. Consequently, the heavy metal and the gel substances are separated from the electrodes, and thus, the electrodes can be cleaned easily and quickly. After the cleaning of the electrodes in the reverse electrolysis, the heavy metal is deposited in such a manner that the acid solution, in which the heavy metal is extracted, is supplied again to the electrolytic bath and then the polarity applied between the electrodes is returned to the original. As a result, the deposit efficiency of the heavy metal can be recovered to the original desirable level.

The electrodes may be cleaned in either a direct-current electrolysis, which keeps the polarity reversed, or an alternating electrolysis, which alternates the polarity of the electrodes continuously. If the protein or fat is adhered to the cathode during the deposit of the heavy metal, the alternating electrolysis is more preferable than the direct-current electrolysis to remove the protein or fat from the electrodes.

Examples of the electrolytic solution for use in the cleaning of the electrodes are neutral or alkali electrolytic solution such as sodium chloride, potassium chloride, ammonium chloride, calcium chloride, hypochlorite, hydrochloric acid, sodium sulfate, sodium nitrate and caustic soda, and the mixture thereof. The filtrated seawater may be used as it is. If the brine and the seawater are used as the electrolytic solution, the medicine is inexpensive, and the brine and the seawater are harmless when they are mixed with the waste marine products to be processed. It is therefore unnecessary to clean the waste marine products, and the working efficiency can be improved significantly.

If the electrolytic solution is left untouched after the cleaning of the electrodes, the solid matters including the heavy metal separated from the electrodes naturally sediments. In this case, the solid matters are filtrated to collect the heavy metal, and the filtrate is repeatedly used for cleaning the electrodes.

Arsenic included in the waste marine products seems to adhere to or combine with the organic matters in the waste marine products, but the actions of arsenic are still unknown. Arsenic having trivalence, quinquevalance, and the like seem to be mixed in the marine produce, and arsenic is dissolved in inorganic acid solution. Some arsenic dissolved in the acid solution may be deposited on the electrodes and the other remains in the acid solution. Arsenic deposited on the electrodes is separated by the reverse electrolysis in the electrolytic solution, and the arsenic sediments together with the oxide and chloride of iron. An alkali agent (e.g., sodium hydroxide) and a flocculant (e.g., iron chloride and calcium chloride) are added to a part of the acid solution so that the acid solution can be alkalescent within the range between pH8 and pH1.5, and more preferably between pH9 and pH11. Thereby, the arsenic sediments from as a hydroxide from the acid solution, and arsenic can be less than the discharge standard of 0.5 mg/L.

According to the present invention, the toxic substances such as the heavy metal and arsenic included in the waste marine products are defatted, heated, dried and the like to become protein-denatured powder at the pretreatment step before the toxic substances are removed from the waste marine products by extracting the toxic substances into the acid solution.

If the waste marine products includes a large amount of crude fat, the broken waste marine products becomes solid in a group, and the contact between the waste marine products and the acid solution is disturbed. As a result, the heavy metal and arsenic cannot be extracted satisfactorily. If the amount of crude fat is less than 15% per dried solid weight (in the case that ethyl ether is used as a solvent), the powder of the marine products in the sulfuric acid solution of 3% and the acid solution is easily separated from the acid solution. In other words, if the slurry phase of the powder of the waste marine products and the acid solution is weakly stirred, the acid solution with a little amount of the waste marine products is formed at the upper area of the slurry. The supply of the solution in the upper area of the slurry between the electrodes prevents the electrodes from being contaminated by the organic matters. The fat has a tendency to combine with heavy metal and phosphorus, and thus, the concentration of the heavy metal and the phosphorus can be lowered by defatting the fat. The fat is mainly the crude fat, which is defatted by pressing or kneading the waste marine products at a temperature of 80° C. The extent of defatting is reduced to less than about 15% in a fat measurement method using a Soxhlet extractor and ethyl ether as a solvent and less than about 22% in a measurement method using normal hexane as a solvent. The extent of defatting must be changed according to the purposes after the treatment of the waste marine products. For example, in order to keep the waste marine products for use as raw material for animal food and the like, the crude fat dissolved in ethyl ether is preferably less than 10% to prevent the oxidization of the waste marine products being kept.

FIG. 1 shows a relation between the initial water content of the internal organs and the viscosity of slurry in the case that the slurry phase is formed by mixing the broken internal organs of shellfishes with the 3% sulfuric acid solution and the slurry is stirred for two hours. Decreasing the initial water content of the suspended internal organs lowers the viscosity of the slurry, so that the slurry can easily be handled with small transporting power. If the apparatus is run at 200cP (centipoise) and the water content of the internal organs is 15%, the concentration of internal organs in the sulfuric acid solution can be 50% per weight. If the initial water content of the internal organs is 30%, the concentration of the internal organs is about 20% per weight, and if the initial water content of the internal organs is 70% (equivalent to moisture of raw internal organs), the concentration of the internal organs is about 10% per weight.

If the concentration of the internal organs in the acid solution, in other words, if the concentration of the waste marine products is high; the concentration of the extracted heavy metal is high, and thus, the electrolysis deposit speed and efficiency can also be high. If the concentration of the waste marine products in the acid solution is high, the amount of the slurry is small. This makes the apparatus smaller and reduces the equipment costs. If the viscosity of the slurry is low, the transporting power can be reduced. If the drying energy for decreasing the initial water content is taken into consideration, the upper limit of the initial water content of the waste marine products for forming the slurry is preferably 25 weight %.

The viscosity of the slurry is correlated with the dissolved amount and denaturation degree of the protein. Thus, the viscosity of the slurry is estimated based on the denaturation degree of the protein. In the case that the amount of a solid collected by acting centrifugal force for three minutes at 1000 G after the particles of the waste marine products is immersed in the 1% sulfuric acid solution for ten minutes is 100; the amount of a solid collected by operating a centrifugal force for three minutes at 1000 G after the particles of the waste marine products is immersed in the 1% sulfuric acid solution for three minutes at 1000 G is 80 or more.

FIG. 2 is a flow chart showing an example of a process for removing the toxic substances such as heavy metal and arsenic from the waste marine products to thereby acquire the powder of the waste marine products with the decreased amount of heavy metal and arsenic.

First, the waste marine products (raw material) is broken, the protein therein is denatured, and then the waste marine products is defatted and dried at the pretreatment steps so as to produce the dried powder.

At the next extraction step, the dried powder of the waste marine products is mixed in the acid solution to produce the slurry. The toxic substances such as heavy metal and arsenic included in the waste marine products in the form of the slurry are extracted into the acid solution. The acid solution is circulated between the extraction step and the electrolysis step, so that the heavy metal extracted into the acid solution can mainly be deposited on the electrodes.

Then, the slurry, from which the heavy metal has mainly be removed, is solid-liquid separated into the solid and the acid solution. The toxic substances such as arsenic, which have been extracted in the acid solution, are separated from the solid-liquid separated acid solution in the flocculant sedimentation in such a manner that an alkali agent and a flocculant are added to a part of the acid solution. The rest of the acid solution is returned to the extraction step. On the other hand, the solid is neutralized, and then the powder of the waste marine products with the decreased amount of arsenic and metal is collected.

The electrodes contaminated by the electrolysis are cleaned in the reverse electrolysis in the neutral or alkali electrolytic solution. The matters (including heavy metal and some arsenic) separated from the electrodes naturally sediments in the electrolytic solution, which is used for cleaning the electrodes. Thus, the sedimenting-separated matters are filtrated and collected. The electrolytic solution, from which the separated matters are removed, is reused.

Figure 3:
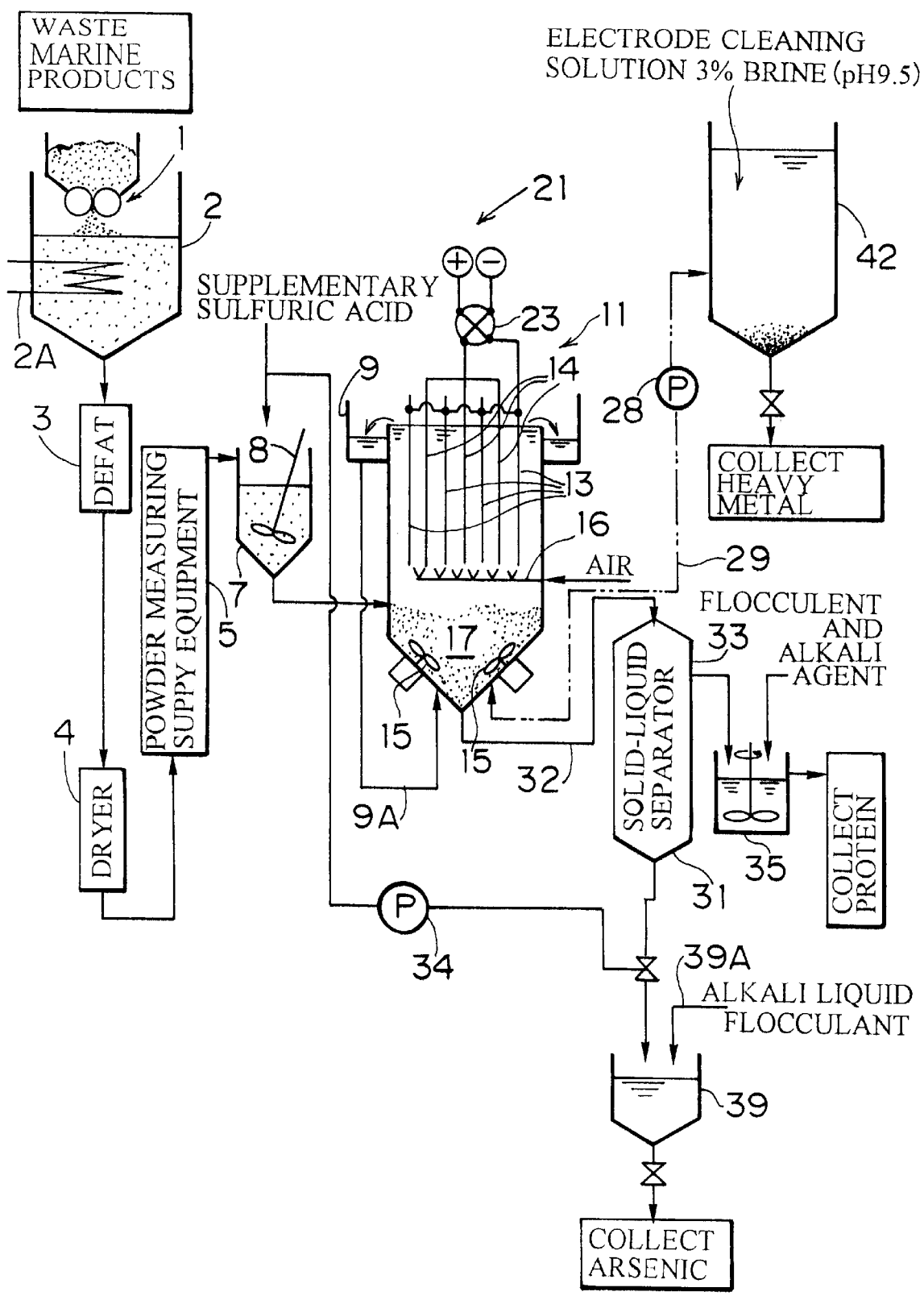
FIG. 3 is a view showing the construction of an apparatus for removing toxic substances from waste marine products according to the present invention.

FIG. 3 is a view of assistance in explaining the structure of the apparatus for removing the toxic substances from the waste marine products according to the present invention. In this example, the waste marine products are the internal organs of scallops.

Usually, the internal organs of 1 kg includes a solid of 0.25 kg (mainly protein); cadmium (Cd) 70–140 mg/dried solid 1 kg, crude fat of 17–25% measured with the solvent being ethyl ether; arsenic (As) 5–20 mg/dried solid 1 kg; and water.

The internal organs are denatured in such a way that they are boiled by a hot water tank 2 having a heater 2A after they are broken by a high-speed cutter 1. The internal organs are broken to such an extent as to pass through a screen of 3.2 mm. For example, The internal organs are boiled in hot water of 90° C. for three minutes. Then, the internal organs are defatted by a defatting apparatus 3, which heats and presses the internal organs. As a result, the crude fat is reduced to less than 15%. The aperture of a pressing screen is about 1.5 mm, and the internal organs are pressed at a temperature of about 90° C. Then, a drier 4 heats the internal organs by steam to denature the protein in the internal organs and produce the dried powder of the internal organs. While the internal organs are dried with steam, the vacuum is reduced to 720 mmHg.

The dried powder of the internal organs is weighed by a powder scale 5 and is supplied to a slurry tank 7. The 1–3% acid solution (e.g., the sulfuric acid solution) is supplied to the slurry tank 7 and is stirred by a stirrer 8. Consequently, the dried powder and the sulfuric acid solution are mixed to form the slurry.

An electrolytic bath 11 has a plurality of electrodes 13, 14 composed of anodes 13 and cathodes 14. The electrodes 13, 14 are connected to an electric current power source 21 through a power source switcher 23. An air pipe 16 having a number of nozzles for blowing out the air is provided below the electrodes 13, 14, and the air is blown to the surfaces of the electrodes 13 and 14 through the nozzles. There is provided an extraction part 17 (the bottom part of the electrolytic bath) with the slurry phase formed therein, and at the extraction part 17, the toxic substances such as heavy metal and arsenic are extracted from the slurry supplied from the slurry tank 7 to the electrolytic bath 11. As the bubbles of the air blown out from the air pipe 16 rise in the electrolytic bath 11, the acid solution of the slurry phase forms a circulatory flow by rising between the electrodes 13, 14, flows into a trough 9 from the top of the electrolytic bath 11, and falls to the extraction part 17 to a return pipe 9A. At the extraction part 17, the dried powder is always stirred by the stirrers 15 to prevent the sedimentation of the dried powder, and thereby, the toxic substances such as heavy metal and arsenic are easily extracted into the acid solution.

In FIG. 3, the heavy metal extraction part 17 is provided at the lower part of the electrolytic bath 11; however, the present invention should not be restricted to this. For example, the toxic substances such as heavy metal may be extracted in the slurry tank 7 and the acid solution, into which the heavy metal in the slurry tank 7 are extracted, may be circulated between the electrolytic bath 11 and the slurry tank 7. Alternatively, another tank for extraction may be provided, and the acid solution may be circulated between this tank and the electrolytic bath 11.

The heavy metal extracted into the acid solution is separated from the acid solution in such a manner that the heavy metal is deposited on the cathodes in the electrolysis. The electrolysis is performed for five to eight hours with the cathode electric current density being at 1.5 A/dm$^2$. After the electrolysis, the slurry in the electrolytic bath 11 is supplied to a solid-liquid separator 33, which solid-liquid separates the slurry through a slurry pipe 32. A belt-press type separator and a centrifugal separator are used as the solid-liquid separator 33. Arsenic is dissolved in the acid solution, from which the solid has been separated, and thus, the acid solution is temporarily stored in an intermediate tank 31, and a part of the acid solution is supplied to a sedimentation tank 39. In the sedimentation tank 39, an alkali agent such as sodium hydroxide and a flocculant such as iron chloride (FeCl$_3$) are added to the acid solution so that pH can be adjusted to 8–11.5 and more preferably 9–11. Thereby, the flocculated matter including the arsenic sediments at the bottom of the sedimentation tank 39 and is separated from the acid solution. The rest of the acid solution in the intermediate tank 31 is supplied to the slurry tank 7 through a pump 34 for reuse. On the other hand, the solid (moist solid) separated by the solid-liquid separator 33 is neutralized by alkali in a neutralization tank 35, and then, it is dried by a vacuum drier (not shown). This obtains the powder of the waste marine products with the heavy metal of less than 5 mg/dried solid 1 kg and arsenic of less than 1 mg/dried solid 1 kg. Consequently, the waste marine products can be used for animal food.

After the electrolysis is performed for the dried powder five to six times in a batch method in the electrolytic bath 11, all the acid solution in the electrolytic bath 11 is supplied to the solid-liquid separators 33 to empty the electrolytic bath 11. Then, a supply pump 28 is run to supply the alkali or neutral electrolytic solution (electrode cleaning solution) stored in a cleaning solution storage tank 42 can be supplied to the electrolytic bath 11 through an electrolytic solution supply pipe 29. Then, the power switcher 23 reverses the polarity to be applied between the electrodes from a power source 21. More specifically, the cathode in the deposition is reversed to the anode, and about ⅒ of the electric current in the deposition is passed through to clean the electrodes. The electrodes 13, 14 can be cleaned more effectively if the amount of air blown out from the air pipe 16 is increased to the maximum to increase the amount of bubbles scraping the surfaces of the electrodes 13, 14. The electrodes 13, 14 can be electrolytically cleaned in the alternating electrolysis by providing an alternating power source (not shown) between the electrodes 13, 14 instead of the electric current power source 21. In particular, if the deposit and the attachment exist at the anode in the deposition of the heavy metal, it is preferable to set the alternating electrolysis mode since both the cathode and the anode can be cleaned.

As a result of the electrode cleaning operation, the deposit, which is mainly composed of the heavy metal, is separated from the electrodes into the electrolytic solution. The electrolytic solution including the separated solid is returned to the cleaning solution storage tank 42. The separated solid sediments at the bottom of the cleaning solution storage tank 42, and the solid is filtrated so that the heavy metal can mainly be collected. The filtrate is returned to the cleaning solution storage tank 42 for reuse.

EXMAPLE

A description will be given of examples in which the heavy metal is removed from the raw internal organs of scallops by using the apparatus for removing the heavy metal from the waste marine products according to the present invention, which was described with reference to FIG. 3.

The First Example

In the first example, an effect of the crude fat on the electrolytic deposition of the heavy metal is checked.

The raw internal organs of the scallops are broken, defatted and dried, and the protein in the internal organs is denatured to thereby produce powder of the waste marine products with the crude fat of 9.3% and 15%.

The raw material powder of 340 g (the raw internal organs of 1.8 kg) and the 3% sulfuric acid solution of 1500 ml are supplied to the electrolytic bath 11. While the air is aerated from below the electrodes so that the diameter of each bubble can be about 2 mm, the electrolysis is performed to deposit the heavy metal in a constant current electrolysis method with the cathode area being 1 dm$^2$ and the electric current density being 1.5 A/dm$^2$. In a comparative example, the electrolysis is performed under the same conditions except that the bubbles are not aerated from below the electrodes. SUS 316 is used as the material for the electrodes.

Every one hour after the start of the electrolysis, the raw material powder is sampled from the electrolytic bath to analyze the cadmium concentration per dried solid, which is compared with the cadmium concentration per dried solid before the electrolysis.

FIG. 4 shows the results. Run1 is a graph in the case that the raw material powder with the crude fat of 9.3% are electrolyzed, and the cadmium concentration reaches the target of 5 mg/dried solid weight 1 kg in three hours. Run2 is a graph in the case that the raw material powder with the crude fat of 15% are electrolyzed, and the cadmium concentration reaches the target of 5 mg/dried solid weight 1 kg in five hours. This indicates that the more the crude fat of the raw material powder is, the longer the time required for the electrolysis is.

Although not shown in FIG. 4, if the air is not aerated, the cadmium reaches the target of 5 mg/dried solid weight 1 kg for more than fifteen hours even if the crude fat of the raw material powder is 9.3%. The bubbles are formed by aerating the air toward the electrodes to thereby reduce the concentration gradient of the heavy metal ions and effectively bread a layer of gel substances adhered to the surfaces of the electrodes or formed near the electrodes, so that the heavy metal can easily be deposited on the electrodes.

The Second Example

In the second example, the effects of the electrode cleaning are checked in the case that the electrolysis is performed continuously to deposit the heavy metal.

The results of the first example show that the cadmium concentration reaches the target of 5 mg/dried solid weight 1 kg in five hours if the air is aerated. Thus, in the second example, the electrolysis time for one batch of electrolysis in the electrolytic bath is set at five hours. The electrolysis from Run1–25 is performed with the raw material powder of 340 g with the crude fat of 8–13%. The cadmium concentration of the raw material powder before the electrolysis from Run 1 to Run 25 is about 90–150 mg/dried solid weight 1 kg.

Figure 5:
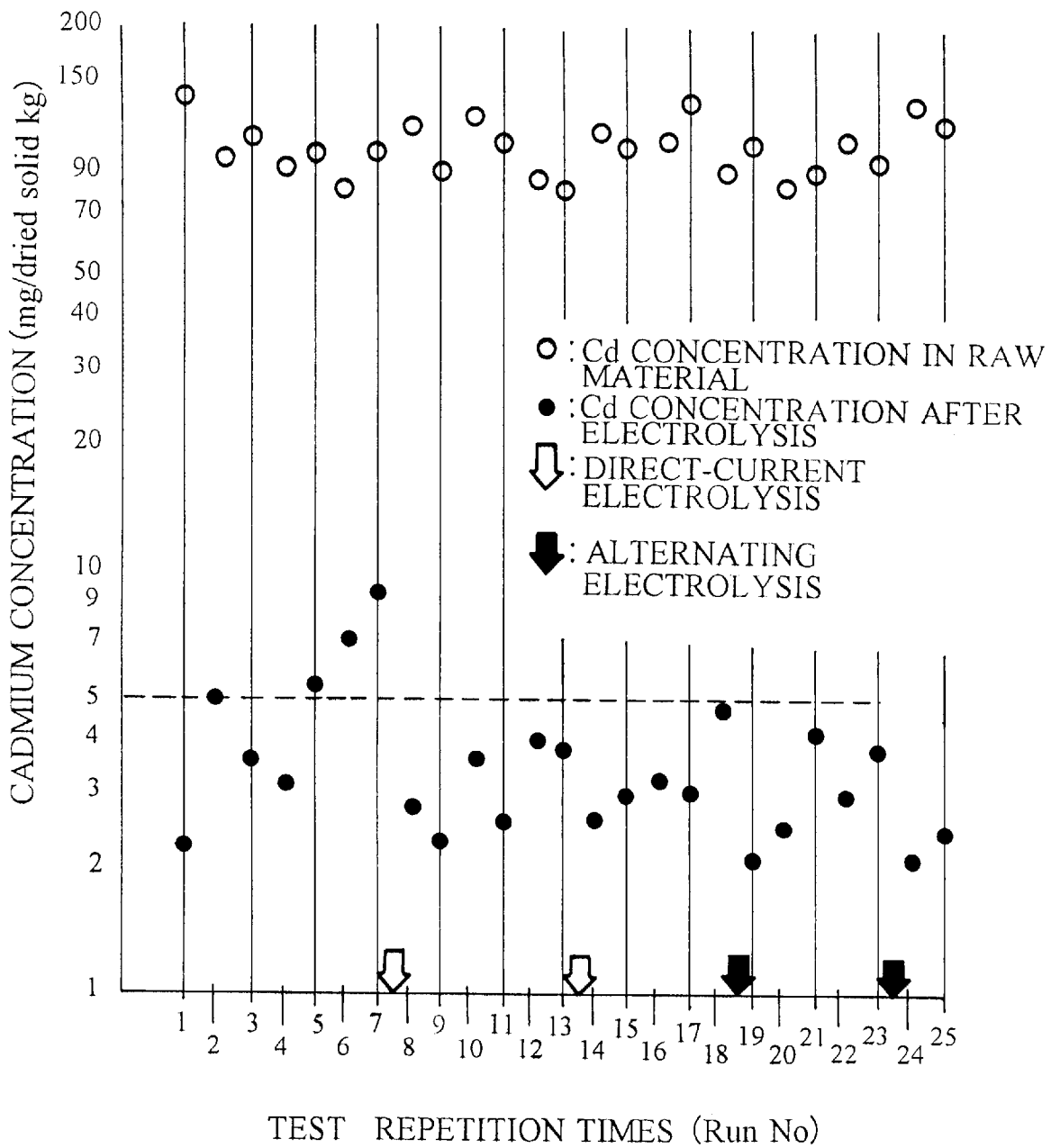
FIG. 5 is a view showing the results of the examination for checking the electrode cleaning effect in the case that the electrolysis is continuously performed for depositing the heavy metal.

FIG. 5 shows the results of Run1–25. The repetition of the electrolysis causes the cadmium concentration after the electrolysis to exceed the target of 5 mg/dried solid weight 1 kg from Run5 to Run7 after the removal performance starts deteriorating. Then, the acid solution in the electrolytic bath is replaced by the 3% brine of pH8.5, and the polarity to be applied between the electrodes is reversed from the polarity in the electrolytic deposition of the heavy metal. The reverse electrolysis is performed for seven minutes to clean the electrodes with the current density being 0.12 A/dm$^2$. Consequently, in Run 8 after the cleaning of the electrodes, the cadmium concentration is reduced to 2.8 mg/dried solid weight 1 kg so as to recover the heavy metal removal performance.

If the reverse electrolysis for cleaning the electrodes is switched to the electrolysis for depositing the heavy metal and the electrolysis is performed continuously, the heavy metal removal performance is gradually deteriorated from Run8 to Run13. Thus, the electrodes are cleaned again after Run13. Consequently, the cadmium concentration is reduced to 2.9 mg/dried solid weight 1 kg in Run14, and the heavy metal removal performance is recovered. The reverse electrolysis after Run7 and Run13 is performed with the direct electric current.

Continuously, the reverse electrolysis for cleaning the electrodes is switched to the electrolysis for depositing the heavy metal and the electrolysis is continuously performed to clean the electrodes after Run18 and Run23. After Run18 and Run23, the electrodes are cleaned in the alternating electrolysis in which the anode and the cathode are switched alternately at intervals of 10 seconds in the solution (the mixture of 1% sodium chloride and 1% sodium sulfate) of pH10.5. In this case, the deposit is removed from the surfaces of the electrodes in five minutes, and the heavy metal removal performance is recovered. Compared with the case where the electrodes are cleaned by the direct electric current power source, the alternating electrolysis significantly reduces wear such as corrosion on the surfaces of the SUS 316 resulting from the local dissolution.

As set forth hereinabove, according to the method and apparatus for removing the toxic substances in the waste marine products, the electrolysis inhibition factors such as the deposit on the electrodes, which deteriorates the deposit efficiency, are easily and quickly removed from the electrodes to thereby improve the electrolysis efficiency. Thus, the desirable electrolysis efficiency can be maintained for a long period of time, and this significantly reduces the time required for electrolytically removing the toxic substances such as the heavy metal from the waste marine products.

Moreover, the air is aerated from below the electrodes in the electrolytic bath to form the flow of the acid solution near the electrodes. Consequently, the heavy metal can efficiently be captured by the electrodes and can be deposited on the electrodes.

In the pretreatment before the extraction process, the marine product is defatted and dried to thereby reduce the amount of the fat and the water content of the waste marine products and denature the protein in the waste marine products. Then, the marine product is suspended in the acid solution to become the slurry. Thus, the viscosity of the slurry is lowered, and the slurry with highly concentrated marine products can be formed. This improves the electrolytic deposition efficiency, reduces the energy required for transferring the acid solution being electrolyzed, decreases the volume of installment and makes it easier to run the apparatus.

Therefore, the toxic substances such as heavy metal and arsenic can be removed from the waste marine products without fail at low costs.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of removing a toxic substance from waste marine products, said method comprising:

an extraction step of bringing waste marine products including heavy metal as a toxic substance into contact with an acid solution including at least one of sulfuric acid and hydrochloric acid to thereby extract the heavy metal from said waste marine products into said acid solution;

an electrolysis step of applying a direct current voltage between electrodes provided in said acid solution, into which said heavy metal is extracted, to thereby deposit said heavy metal in said acid solution on said electrodes; and an electrode cleaning step of reversing the polarity applied between said electrodes in a neutral or alkali electrolytic solution from the polarity in said electrolysis to thereby remove said heavy metal from said electrodes, wherein in a pretreatment before said extraction step, crude fat of said waste marine products measured using ethyl ether as a solvent is reduced to 15% or less per dried solid weight; a water content is reduced to 25% or less; and protein in said waste marine products is denatured.

2. The method of removing the toxic substance from the waste marine products as defined in claim 1, wherein the acid solution in slurry, which is formed by mixing powder of said waste marine products and said acid solution, is circulated between said extraction step and said electrolysis step to extract said heavy metal and deposit said heavy metal on said electrodes.

3. The method of removing the toxic substance from the waste marine products as defined in claim 2, wherein a circulating flow of the acid solution circulated between said extraction step and said electrolysis step i s formed by a rising force of bubbles in the air blown into said acid solution, said bubbles rising between said electrodes.

4. A method of removing a toxic substance from waste marine products, said method comprising:

an extraction step of bringing waste marine products including heavy metal as a toxic substance into contact with an acid solution including at least one of sulfuric acid and hydrochloric acid to thereby extract the heavy metal from said waste marine products into said acid solution;

an electrolysis step of applying a direct current voltage between electrodes provided in said acid solution, into which said heavy metal is extracted, to thereby deposit said heavy metal in said acid solution on said electrodes; and an electrode cleaning step of reversing the polarity applied between said electrodes in a neutral or alkali electrolytic solution from the polarity in said electrolysis to thereby remove said heavy metal from said electrodes, wherein if said waste marine products includes arsenic as a toxic substance, an alkali agent and a flocculant are added to the acid solution, from which said waste marine products is separated after said electrolysis step, to thereby adjust the acid solution to pH8–11.5 so that flocculation including arsenic can sediment in said acid solution.

5. The method of removing the toxic substance from the waste marine products as defined in claim 4, wherein in a pretreatment before said extraction step, crude fat of said waste marine products measured using ethyl ether as a solvent is reduced to 15% or less per dried solid weight; a water content is reduced to 25% or less; and protein in said waste marine products is denatured.

6. An apparatus for removing a toxic substance from waste marine products, said apparatus comprising:

a pretreatment part, wherein crude fat of said waste marine products measured using ethyl ether as a solvent is reduced to 15% or less per dried solid weight; a water content is reduced to 25% or less; and protein in said waste marine products is denatured;

an extraction part for bringing waste marine products including heavy metal as a toxic substance into contact with an acid solution including at least one of sulfuric acid and hydrochloric acid to thereby extract the heavy metal from said waste marine products into said acid solution;

an electrolysis part for applying a direct current voltage between electrodes provided in said acid solution, into which said heavy metal is extracted, to thereby deposit said heavy metal in said acid solution on said electrodes; and an electrode cleaning part for reversing the polarity applied between said electrodes in a neutral or alkali electrolytic solution from the polarity in said electrolysis to thereby remove said heavy metal from said electrodes.

7. The apparatus for removing the toxic substance from the waste marine products as defined in claim 6, wherein said electrodes are arranged above said extraction part, and air bubbling means is provided between said electrodes and said extraction part, and a circulating flow of said acid solution is formed between said extraction part and said electrodes by a rising force of bubbles in the air blown out from said air bubbling means.

* * * * *